US012621223B2

(12) United States Patent
Kattepur et al.

(10) Patent No.: US 12,621,223 B2
(45) Date of Patent: May 5, 2026

(54) INDUSTRIAL 5G SERVICE QUALITY ASSURANCE VIA MARKOV DECISION PROCESS MAPPING

(71) Applicant: Telefonaktiebolaget LM Ericsson (publ), Stockholm (SE)

(72) Inventors: Ajay Kattepur, Bangalore (IN); Anil Ramachandran Nair, Bangalore Karnataka (IN); Merve Saimler, Istanbul (TR); Yunus Donmez, Istanbul (TR)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 354 days.

(21) Appl. No.: 18/560,512

(22) PCT Filed: Jun. 29, 2022

(86) PCT No.: PCT/TR2022/050677
§ 371 (c)(1),
(2) Date: Nov. 13, 2023

(87) PCT Pub. No.: WO2023/022679
PCT Pub. Date: Feb. 23, 2023

(65) Prior Publication Data
US 2024/0275697 A1 Aug. 15, 2024

(30) Foreign Application Priority Data
Aug. 14, 2021 (IN) .............................. 202111036877

(51) Int. Cl.
*H04L 41/00* (2022.01)
*H04L 41/0894* (2022.01)
(Continued)

(52) U.S. Cl.
CPC ...... *H04L 41/5025* (2013.01); *H04L 41/0894* (2022.05); *H04L 41/142* (2013.01);
(Continued)

(58) Field of Classification Search
CPC ............. H04L 41/5025; H04L 41/0894; H04L 41/142; H04W 24/02; H04W 24/08; H04W 28/24
See application file for complete search history.

(56) References Cited

U.S. PATENT DOCUMENTS

2008/0243439 A1* 10/2008 Runkle .............. G08B 21/0476
                                                        702/182
2009/0312985 A1* 12/2009 Eliazar ................... G01S 13/58
                                                        702/187
(Continued)

FOREIGN PATENT DOCUMENTS

WO          2009114649 A2      9/2009
WO      WO-2012072445 A1 *    6/2012    ......... H04L 41/0823

OTHER PUBLICATIONS

International Search Report and Written Opinion dated Aug. 19, 2022 for International Application No. PCT/TR2022/050677 filed Jun. 29, 2022, consisting of 13 pages.
(Continued)

*Primary Examiner* — Khai M Nguyen
(74) *Attorney, Agent, or Firm* — Weisberg I.P. Law, P.A.

(57) ABSTRACT

A quality assurance method, performed in a device, includes defining a set of states of a joint system of a communication service provider and a consumer of the service, defining a set of actions each corresponding to a change of one or more QoS characteristics of the service, using a partially observable Markov decision process (POMDP) to define a control policy mapping beliefs about the state of the joint system to preferred actions taken on the service, receiving observations indicative of performance indicators of a process
(Continued)

400

S401 — Define set of (hidden) joint system states S

S402 — Define set of actions A (QoS characteristics changes)

S403 — Use POMDP to define control policy, mapping beliefs b to actions a

S404 — Receive observations o indicative of process performance indicator(s)

S405 — Update current belief based on received observations

S406 — Control communication service based on current belief by performing actions as suggested by control policy performed by the consumer, updating a belief about the state of the joint system based on the observations, and using the control policy to control the service to make the service operate more efficiently while fulfilling a service level agreement (SLA) with the consumer. A device, joint system, computer program and computer program product are also provided.

20 Claims, 3 Drawing Sheets

(51) Int. Cl.
    *H04L 41/142* (2022.01)
    *H04L 41/5025* (2022.01)
    *H04W 24/02* (2009.01)
    *H04W 24/08* (2009.01)
    *H04W 28/24* (2009.01)
(52) U.S. Cl.
    CPC ........... *H04W 24/02* (2013.01); *H04W 24/08* (2013.01); *H04W 28/24* (2013.01)

(56) References Cited

U.S. PATENT DOCUMENTS

| | | | |
|---|---|---|---|
| 2018/0183683 A1* | 6/2018 | Geng | H04L 43/065 |
| 2021/0014132 A1* | 1/2021 | Smith | H04L 41/5019 |
| 2021/0019194 A1* | 1/2021 | Bahl | H04L 67/1031 |
| 2022/0113785 A1* | 4/2022 | Lu | G06N 7/01 |

OTHER PUBLICATIONS

Grosjean, L., et al., Forward looking smart manufacturing use cases, requirements and KPIs, Project Title: 5G Smart Manufacturing, 5G Smart, Version 1.0, Jun. 30, 2020, consisting of 74 pages.

Kiesel, R., et al., Quantification of Influence of 5G Technology Implementation on Process Performance in Production, 54th CIRP Conference on Manufacturing Systems, Science Direct, Elsevier B.V., 2021, consisting of 6 pages.

Kurniawati, H., et al., SARSOP: Efficient Point-Based POMDP Planning by Approximating Optimally Reachable Belief Spaces, Proc. Robotics: Science and Systems, 2008, consisting of 8 pages.

Xiao, Y., et al., Dynamic Network Slicing for Scalable Fog Computing Systems With Energy Harvesting; IEEE Journal on Selected Areas in Communications, vol. 36, No. 12, Jan. 28, 2020, consisting of 14 pages.

Grieves, M., et al., Digital Twin: Mitigating Unpredictable, Undesirable Emergent Behavior in Complex Systems (Excerpt), Trans-Disciplinary Perspectives on System Complexity, 2017, consisting of 7 pages.

Wang, H., et al., Optimal Self-Healing of Service-Oriented Systems with Incomplete Information, 2013 IEEE International Congress on Big Data, IEEE Computer Society, Jun. 27, 2013, consisting of 8 pages.

\* cited by examiner

300

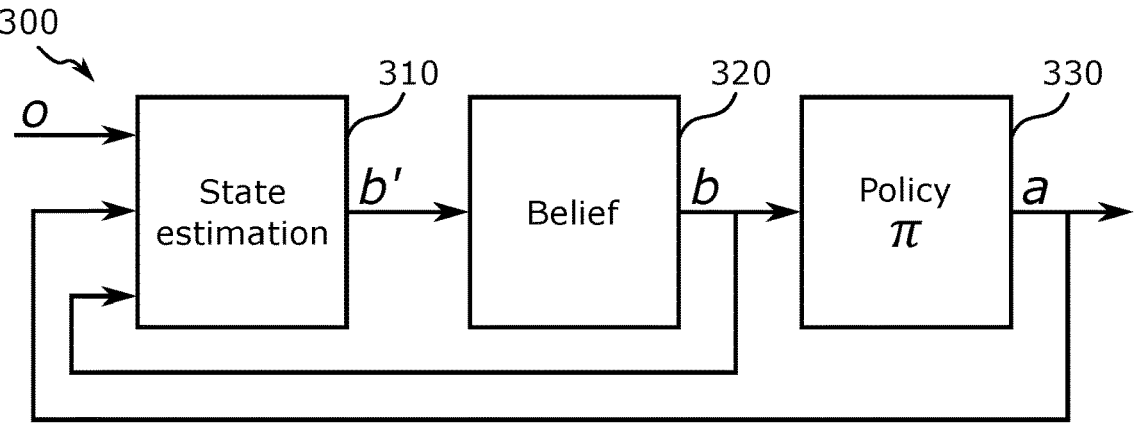

310   320   330

*o* → State estimation → *b'* → Belief → *b* → Policy π → *a* →

S401 — Define set of (hidden) joint system states *S*

S402 — Define set of actions *A* (QoS characteristics changes)

S403 — Use POMDP to define control policy, mapping beliefs *b* to actions *a*

S404 — Receive observations *o* indicative of process performance indicator(s)

S405 — Update current belief based on received observations

S406 — Control communication service based on current belief by performing actions as suggested by control policy

Fig. 4

INDUSTRIAL 5G SERVICE QUALITY ASSURANCE VIA MARKOV DECISION PROCESS MAPPING

CROSS-REFERENCE TO RELATED APPLICATIONS

This application is a Submission Under 35 U.S.C. § 371 for U.S. National Stage Patent Application of International Application No.: PCT/TR2022/050677, filed Jun. 29, 2022 entitled "INDUSTRIAL 5G SERVICE QUALITY ASSURANCE VIA MARKOV DECISION PROCESS MAPPING," which claims priority to Indian Application No.: 202111036877, filed Aug. 14, 2021," the entireties of both of which are incorporated herein by reference.

TECHNICAL FIELD

The present disclosure relates to communication networks when used to provide communication services to consumers. In particular, the present disclosure relates to how a computing device associated with such networks can use partially observable Markov decision processes in order to increase network robustness and reliability.

BACKGROUND

Modern and future industrial deployments are likely to become increasingly complex, especially if implementing changes conceptualized by the so-called Fourth industrial revolution (or "Industry 4.0"). As an example, so-called smart manufacturing may involve a linking of multiple subsystems such as machinery, robots, internet-of-things (IoT), various machine learning algorithms, and current and next-generation mobile telecommunications systems. With such an increased complexity, the critical role of quality assurance (QA) becomes more difficult.

In order to provide a unified view of quality assurance across multiple use-cases in Industry 4.0-related processes, accurate parametrization, mapping, data analysis and closed loop controls are needed. To ensure optimal performance, Industry 4.0-related applications require robust and reliable connectivity, and the emergence of Fifth-generation (5G) private networks attempts to provide differentiated services for various industrial traffic requirements. To guarantee service quality, it is imperative to correctly map how various metrics of the Industry 4.0 domain are affected by changes made in the 5G network domain, as such mapping is needed to ensure optimal system performance without the need for e.g. 5G network over-provisioning or requirement violations.

To assess the performance of e.g. Industry 4.0-related manufacturing processes, various key performance indices (KPIs) are typically defined in ISO/IEC formats. Examples of such KPIs include production rates, failure rates, and machine stoppage times. These KPIs are then acted upon by a network service quality assurance layer in order to ensure that the 5G network meets these requirements. The 5G networks are in turn evaluated in terms of other metrics such as packet delay, packet drop rates, packet throughput, and e.g. network availability.

In accordance with commonly available technology, understanding how the metrics of the 5G networks relate to (and affect) the KPIs of manufacturing processes is not an easy task, and often requires both analysis and intervention by experts trained in the field (i.e. manual tuning of one or more parameters of the 5G network, and often in a trialand-error-like process). Consequently, how to configure a 5G network in terms of optimal resource allocation, usage efficiency and reliability while still meeting the demands for service quality posed by a consumer (such as e.g. a smart manufacturing plant) is a difficult task. As a result, 5G networks often end up being over-dimensioned and/or operating at a sub-optimal level in order to not risk accidentally failing to deliver in accordance with an agreement established with the consumer.

SUMMARY

In light of the above, there is therefore a need for an improved way of configuring a communication service (such as a 5G network service) in order to meet a particular service level agreement (SLA) with a consumer of the communication service.

For this purpose, the present disclosure provides an improved method of quality assurance performed in a computing device associated with a communication service provider, and a corresponding computing device, joint system, computer program and computer program product as defined by the accompanying independent claims. Various embodiments of the improved method, computing device, joint system, computer program and computer program product are defined by the accompanying dependent claims.

According to a first aspect, there is provided a method of quality assurance performed in a computing device associated with a communication service provider. The method includes defining a set of states (S) of a joint system comprising a communication service provided by the communication service provider and a process performed by a consumer while consuming the communication service. In the envisaged method, each state (s∈S) is a hidden state of the joint system, and each such hidden state corresponds to a degree of fulfillment of a service level agreement (SLA) with the consumer of the communication service and a degree of efficiency of the communication service. The method further includes defining a set of actions (A), wherein each action (a∈A) corresponds to a changing of one or more Quality of Service (QoS) characteristics of the communication service. The method further includes using a partially observable Markov decision process (POMDP) to define a control policy ($\pi$) mapping beliefs about the state of the joint system to preferred actions in order to at least eventually move the joint system towards a state corresponding to a higher degree of SLA-fulfillment and/or a higher degree of efficiency. The method further includes receiving observations (o) indicative of one or more performance indicators for the process performed by the consumer. The method further includes, based on the received observations, establishing or updating a belief (b) about a current state of the joint system. The method finally includes, based on the belief about the current state of the joint system, controlling the communication service by performing one or more actions of the set of actions as suggested by the control policy.

As used herein, a "communication service provider" may e.g. be an owner or provider of a 5G network (service), such as a provider of a 5G private network, which the consumer (e.g. a manufacturing plant) may consume in order to enable various components (of e.g. a manufacturing process) to communicate with each other. A POMDP is assumed to have its standard meaning within the field of e.g. reinforcement learning, and examples of such decision processes will be provided later herein. That a state of the joint system is "hidden" implies that the true state of the joint system (i.e.

whether the SLA is fulfilled/unfulfilled and the communication service is efficient/inefficient) cannot be directly observed, but instead needs to be inferred based on the observations and actions of the envisaged model.

The present disclosure and the envisaged method improve upon currently available technology in that it allows to infer the true state (which is not directly observable) of the joint system from actions and observations, and in particular when the process performed by the consumer of the communication service cannot be directly controlled. By so doing, the envisaged method allows for an accurate mapping from the consumer domain to the communication service domain, and vice versa, without the need for inputs from one or more experts or any reliance on trial-and-error. The envisaged method may also work with multiple traffic patterns (such as e.g. periodic transmission, continuous transmission, and burst transmission), and is not only applicable to manufacturing processes but also to e.g. other processes such as autonomous vehicles, AR/VR, gaming, or similar, wherein a need to tune the communication service in an optimal way is present. In particular, the performed mapping of how changes in QoS characteristics of the communication service affects the performance indicators of the consumer's process allows to improve the reliability of the communication service, while preventing over- or under-provisioning of the 5G network just to fulfill the SLA with the consumer. As used herein, that the computing device is "associated with the communication service provider" means e.g. that the computing device is part of a system of the communication service provider and not e.g. part of a system of a consumer of the communication service. It is envisaged, for example, that the computing device may form part of a quality assurance system owned and operated by the communication service provider.

In some embodiments of the method, the one or more QoS characteristics may be selected from: packet delay, packet loss, priority, and guaranteed/non-guaranteed bit rate. In some embodiments, the QoS characters may be selected from the 5G QoS parameters part of QoS implementation as specified in specification 23.501 ("System architecture for the 5G System") made available by the 3rd Generation Partnership Project (3GPP), and including e.g. 5G QoS Identifier (5GQI); Allocation and Retention Priority (ARP); Reflective QoS Attribute (RQA); Notification Control; Flow Bit Rates; Aggregated Bit Rates; Default Values, and Maximum Packet Loss Rate.

In some embodiments of the method, the processing performed by the consumer may be a manufacturing process, and the one or more performance indicators may be selected from: throughput rate, availability/capacity, efficiency in terms of e.g. energy consumption, cycle time, downtime, and machine production capability. In some embodiments, the one or more performance indicators may be selected from e.g. those proposed in ISO standard 22400 (relating to manufacturing processes) and/or from those proposed in IEC standard 62264 (also related to manufacturing processes).

In some embodiments, the process performed by the consumer may be a process in the domain of autonomous vehicles. In some embodiments, the one or more performance indicators may then be selected from e.g. those proposed in ISO standard 22737 (related to autonomous vehicles).

In some embodiments, the process performed by the consumer may be a process in the domain of augmented reality. In some embodiments, the one or more performance indicators may then be selected from e.g. those proposed in IEEE standard P2048 (related to virtual and augmented reality, VR/AR).

Phrased differently, in some embodiments of the method, the process performed by the consumer, and the performance indicators for the process, may be as defined in any one of ISO 22400, IEC 62264, ISO 22737 and/or IEEE P2048.

In some embodiments of the method, defining the control policy may include using a point-based algorithm for solving the POMDP problem, and may further include sampling from a reachable space. One example of such an algorithm is Successive Approximations of the Reachable Space under Optimal Policies (acronym SARSOP) as presented by H. Kurniawati et al in the publication "SARSOP: Efficient point-based POMDP planning by approximating optimally reachable belief spaces", In Proc. Robotics: Science and Systems, 2008.

In some embodiments of the method, the set of states of the joint system may include at least: i) a first state corresponding to the SLA not being fulfilled and to the communication service not being efficient; ii) a second state corresponding to the SLA being fulfilled and to the communication service not being efficient; iii) a third state corresponding to the SLA not being fulfilled and to the communication service being efficient, and iv) a fourth state corresponding to the SLA being fulfilled and to the communication service being efficient.

In some embodiments of the method, as mentioned above, the communication service (offered by the communication service provider) may be a Fifth-generation (5G) mobile communications service. It is of course also envisaged that the present disclosure, and the envisaged method, may apply also to other future communication services eventually succeeding 5G, such as e.g. Sixth-generation (6G) mobile communication service, or similar, as long as the problem of how to find an optimal configuration of such a service in order to meet an SLA with a consumer of the communication service still remains.

In some embodiments of the method, the method may include receiving the observations and/or controlling the communication service using one or more digital twin interfaces. Herein, a "digital twin" may correspond to, or be a further development of, the concept introduced by M. Grieves and J. Vickers in the publication "Digital Twin: Mitigating Unpredictable, Undesirable Emergent Behavior in Complex Systems", In: J. Kahlen, S. Flumerfelt, A. Alves (eds) Transdisciplinary Perspectives on Complex Systems, Springer, Cham. in 2017. A "digital twin" (or "mirrored space model", or "information mirroring model") may e.g. serve as a replica of what is actually happening in a process performed on e.g. a factory production floor or similar, and an interface to such a digital twin may provide a means for e.g. obtaining the one or more performance indicators (KPIs) for such a process in real time.

In some embodiments of the method, the method may further include implementing a reward structure of the POMDP by assigning positive or higher rewards for states having a higher degree of SLA-fulfillment and/or a higher degree of efficiency, and by assigning negative or lower rewards for states having a lower degree of SLA-fulfillment and/or a lower degree of efficiency. A state in which the SLA is fulfilled and the communication service is efficient may e.g. be assigned a highest reward, while a state in which the SLA is not fulfilled and the communication service is not efficient may e.g. be assigned a lowest reward. Consequently, such a reward policy may ensure or at least increase a probability of arriving in an optimal end-state with regards to both SLA-fulfillment and communication service efficiency.

According to a second aspect of the present disclosure, a computing device for quality assurance is provided. The computing device includes processing circuitry and a memory storing instructions. The instructions are such that they, when executed by the processing circuitry, cause the computing device to: define a set of states (S) of a joint system comprising a communication service provided by the communication service provider and a process performed by a consumer while consuming the communication service, wherein each state (s∈S) is a hidden state of the joint system, and wherein each such hidden state corresponds to a degree of fulfillment of a service level agreement, SLA, with the consumer of the communication service and a degree of efficiency of the communication service; define a set of actions (A), wherein each action (a∈A) corresponds to a changing of one or more Quality of Service, QoS, characteristics of the communication service; use a partially observable Markov decision process, POMDP, to define a control policy (π) mapping beliefs about the state of the joint system to preferred actions in order to at least eventually move the joint system towards a state corresponding to a higher degree of SLA-fulfillment and/or a higher degree of efficiency; receive observations (o) indicative of one or more performance indicators for the process performed by the consumer; based on the received observations, establish or update a belief (b) about a current state of the joint system; and, based on said belief about the current state of the joint system, control the communication service by performing one or more actions of the set of actions as suggested by the control policy. The instructions are thus such that they, when executed by the processing circuitry, causes the computing device to perform the method of the first aspect.

In some embodiments of the computing device, the instructions may be further such that they, when executed by the processing circuitry of the computing device, cause the computing device to perform a method according to any embodiment of the method of the first aspect.

According to a third aspect of the present disclosure, a joint system is provided. The joint system includes a first system configured to provide a communication service and a second system configured to consume the communication service. The joint system further includes at least one computing device according to the second aspect of the present disclosure (or any embodiment thereof as envisaged and discusses herein). The computing device is communicatively coupled to both the first system and the second system, and configured to receive the one or more performance indicators from the second system to control the communication system provided by the first system.

In some embodiments of the joint system, the second system may form part of an Industry 4.0 solution (such as e.g. a smart factor, or similar).

According to a fourth aspect of the present disclosure, a computer program for quality assurance is provided. The computer program include computer code which, when run on a processing circuitry of a computing device (such as the computing device of the second aspect or any embodiment thereof disclosed and discussed herein), causes the computing device to: define a set of states (S) of a joint system comprising a communication service provided by the communication service provider and a process performed by a consumer while consuming the communication service, wherein each state (s∈S) is a hidden state of the joint system, and wherein each such hidden state corresponds to a degree of fulfillment of a service level agreement, SLA, with the consumer of the communication service and a degree of efficiency of the communication service; define a set of actions (A), wherein each action (a∈A) corresponds to a changing of one or more Quality of Service, QoS, characteristics of the communication service; use a partially observable Markov decision process, POMDP, to define a control policy (π) mapping beliefs about the state of the joint system to preferred actions in order to at least eventually move the joint system towards a state corresponding to a higher degree of SLA-fulfillment and/or a higher degree of efficiency; receive observations (o) indicative of one or more performance indicators for the process performed by the consumer; based on the received observations, establish or update a belief (b) about a current state of the joint system; and, based on said belief about the current state of the joint system, control the communication service by performing one or more actions of the set of actions as suggested by the control policy. The computer code is thus such that it, when run on the processing circuitry, causes the computing device to perform the method of the first aspect.

In some embodiments of the computing program, the computer code may be further such that it, when run on the processing circuitry of the computing device, causes the computing device to perform a method according to any embodiment of the method of the first aspect.

According to a fifth aspect of the present disclosure, a computer program product is provided. The computer program product includes a computer-readable storage medium, on which the computer program of the fourth aspect (or any embodiment thereof disclosed and discussed herein) is stored. As used herein, the computer-readable storage medium may e.g. be non-transitory, and be provided as e.g. a hard disk drive (HDD), solid state drive (SDD), USB flash drive, SD card, CD/DVD, and/or as any other storage medium capable of non-transitory storage of data. In other embodiments, the computer-readable storage medium may be transitory and e.g. correspond to a signal (electrical, optical, mechanical, or similar) present on e.g. a communication link, wire, or similar means of signal transferring.

Other objects and advantages of the present disclosure will be apparent from the following detailed description, the drawings and the claims. Within the scope of the present disclosure, it is envisaged that all features and advantages described with reference to e.g. the method of the first aspect are relevant for, apply to, and may be used in combination with also the computing device of the second aspect, the joint system of the third aspect, the computer program of the fourth aspect, and the computer program product of the fifth aspect, and vice versa.

BRIEF DESCRIPTION OF THE DRAWINGS

Exemplifying embodiments will be described below with reference to the accompanying drawings, in which:

FIG. 3 schematically illustrates a partially observable Markov decision process of embodiments of a method according to the present disclosure;

FIG. 4 schematically illustrates a flow of an embodiment of a method according to the present disclosure;

Figure 1:
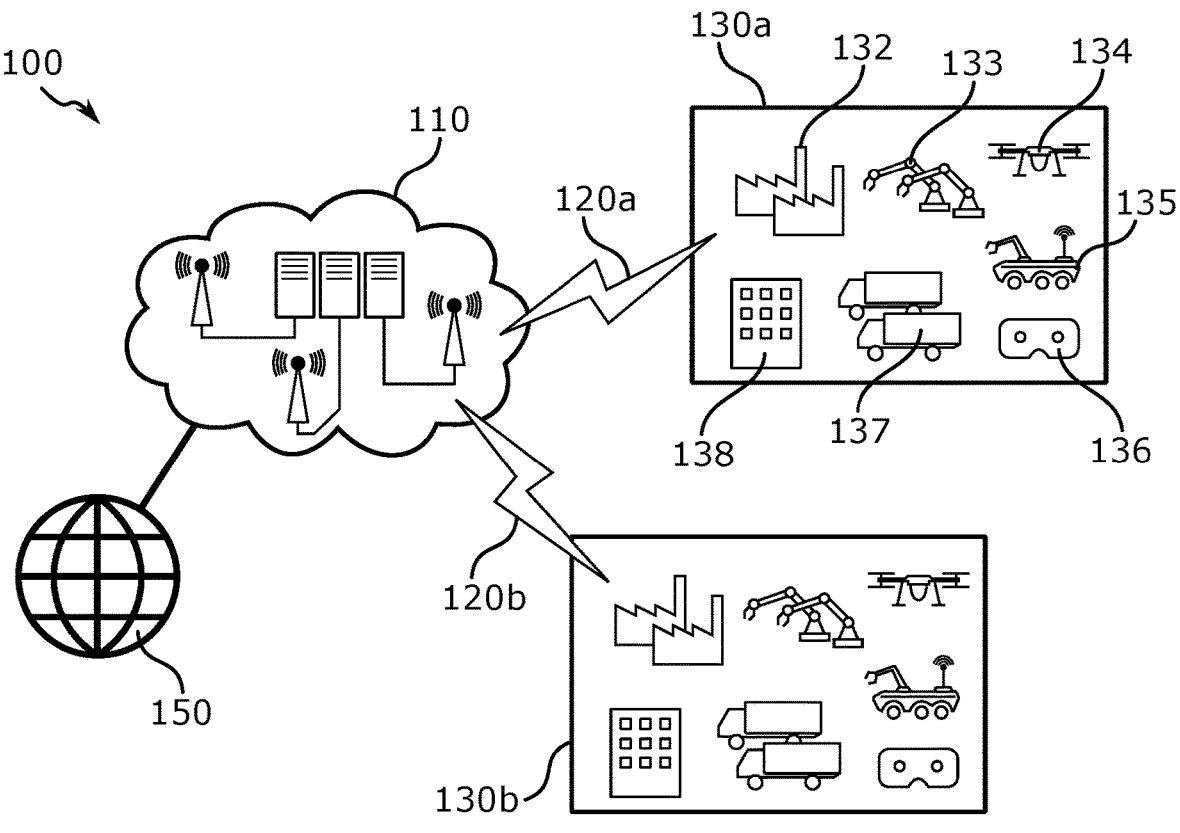
FIG. 1 schematically illustrates a joint system of a communication service provider and a consumer of the communication service.

In the drawings, like reference numerals will be used for like elements unless stated otherwise. Unless explicitly stated to the contrary, the drawings show only such elements that are necessary to illustrate the example embodiments, while other elements, in the interest of clarity, may be omitted or merely suggested.

DETAILED DESCRIPTION

A typical example of where the teachings of the present disclosure are applicable will now be described with reference to FIG. 1.

FIG. 1 schematically illustrates a joint system 100. The joint system 100 includes a first 110 which is configured to provide a communication service. The first system 110 may for example be a telecommunications network provider/operator, such as for example a 5G network or similar. The first system 110 provides e.g. event-driven, periodic and/or other traffic transmission as various communication services 120a and 120b which are consumed by a second system 130a and a third system 130b, respectively. The first system 110 may be connected also to e.g. the Internet 150, such that the second and third systems 130a and 130b may access the Internet 150 via the communication services 120a and 120b.

The second and third systems 130a and 130b are for example any combination of (smart) factories 132, industrial robots 133, unmanned aerial vehicles/drones (UAVs) 134, remote robotic devices 135, virtual- and/or augmented reality (VR/AR) devices 136, autonomous driving vehicles 137, smart homes/offices 138, or similar. Using the second system 130a as an example, such processes may for example be one or more manufacturing processes (in case the second system 130a is a smart factory 132 and/or at least a robotic 133 system), one or more reconnaissance/navigation processes (in case the second system 130a includes one or more UAVs/drones 134, one or more semiautonomous or fully autonomous driving/navigation processes (in case the second system 130a includes such vehicles 137), etc. If focusing on manufacturing, the second and third systems 130a and 130b may for example form part of Industry 4.0.

In particular, a system such as the second system 130a depends on the communication service 120a provided by the first system 110 in order to carry out its respective process (es), and the reliability and robustness of the offered communication service 120a is thus critical to the success of the second system 130a when attempting to perform its process. Thus, the second system 130a has a desire that the communication service 120a is configured to be as reliable and robust as possible. In addition, the second system 130a may also be affected by e.g. a bandwidth and/or speed of the communication service 120a, and it is therefore often in the interest of the second system 130a that the communication service 120a is, in addition to being reliable and robust, also as fast as possible in terms of communication speeds and bandwidth.

Before the communication service 120a is delivered by the first system 110 to the second system 130a, a service-level agreement (SLA) is often signed by both parties (i.e. the owner/operator of the first system 110 and the owner/operator of the second system 130a), wherein it is stipulated what level of service in terms of e.g. network reliability and robustness the first system 110 is to provide in order for the SLA to be fulfilled. This such that the second system 130a can e.g. plan the execution of its internal processes (such as a manufacturing process) in a predictive way.

The first system 100 of course wants to meet the agreed upon terms and deliver a reliable and robust communication service 120a to the second system 130a. However, the owner/operator of the first system 110 is often not interested in over-dimensioning the first system 110 only to satisfy the owner/operator of the second system 130a. Instead, the first system 110 is often preferably (from the perspective of its owner/operator) configured as minimal as possible, and without using any additional resources (in terms of e.g. hardware) which is not absolutely required to meet the SLA with the second system 130a. This in order to e.g. consume less energy, and to e.g. instead use the hardware resources thus released for e.g. providing one or more other communication services to other systems/consumers.

From the perspective of the owner/operator of the first system 110 (hereinafter referred to just as the "perspective of the first system 110"), a problem when performing such an optimization is that the first system 110 may often not directly observe whether the SLA with the second system 130a is currently being met or not. Although the first system 110 may be aware of how effective it itself is in terms of efficiency, the lack of knowledge about whether the SLA is currently met makes it hard to optimize the system to e.g. operate more efficiently. This because as whether the SLA is currently being met or not is not directly observable, neither is how various changes made to the first system 110 affects the performance of the second system 130a. Instead, various performance indicators (e.g. Key Performance Indicators, KPIs) are available which only describes various measures/metrics such as rate of productivity, failure rate, downtime, etc., of e.g. a factory or similar, and any tuning of the first network 110 has to be based on such KPIs.

As mentioned in the introduction, there is conventionally however no clear mapping of how changes to the various tuning parameters of the first network 110 affects the performance of the process(es) performed by the second system 130a, and tuning of the parameters of the first system 110 is therefore conventionally a difficult task. As also mentioned in the introduction, the most used method of tuning involves the use of operator expertise and experience in order to, often using trial-and-error, manually tune the parameters.

As envisaged herein, there may be performance indicators related to the communication service (e.g. a 5G network). For example, these may be determined using the concept of a Network Data Analytics Function (NWDAF) as proposed by 3Gpp, e.g. by collecting data from user equipment, network functions, and operations systems, administration systems, and maintenance systems, etc., from e.g. a 5G core, cloud, or edge network. In e.g. smart manufacturing, KPIs for the communication service may include e.g. average data rate, latency, availability/reliability, connectivity/mobility, number of end devices, and jitter, etc. Some or all of e.g. such KPIs may be used to determine whether the communication service is operating efficiently or not.

Exemplifying embodiments illustrating how the present disclosure improves upon the conventional situation will now be described in more detail with reference also to FIGS. 2, 3, 4, 5, 6A and 6B, illustrating various methods, computing devices and joint systems, and serving to illustrate the principle of envisaged computer programs and computer program products as well. The drawings and the Figures thereon show only certain embodiments of the present disclosure. The envisaged invention of the present disclosure may, however, be embodied in many different forms and should not be construed as limited to the embodiments set forth herein; rather, these embodiments are provided for thoroughness and completeness, and fully convey the scope of the present disclosure to the skilled person.

The present disclosure envisages an improved way of performing quality assurance (QA) in a system as described above, which overcomes the problem of having to manually tune communication service parameters while also being uncertain of how the changes affect the processes of a consumer of the communication service.

Figure 2:
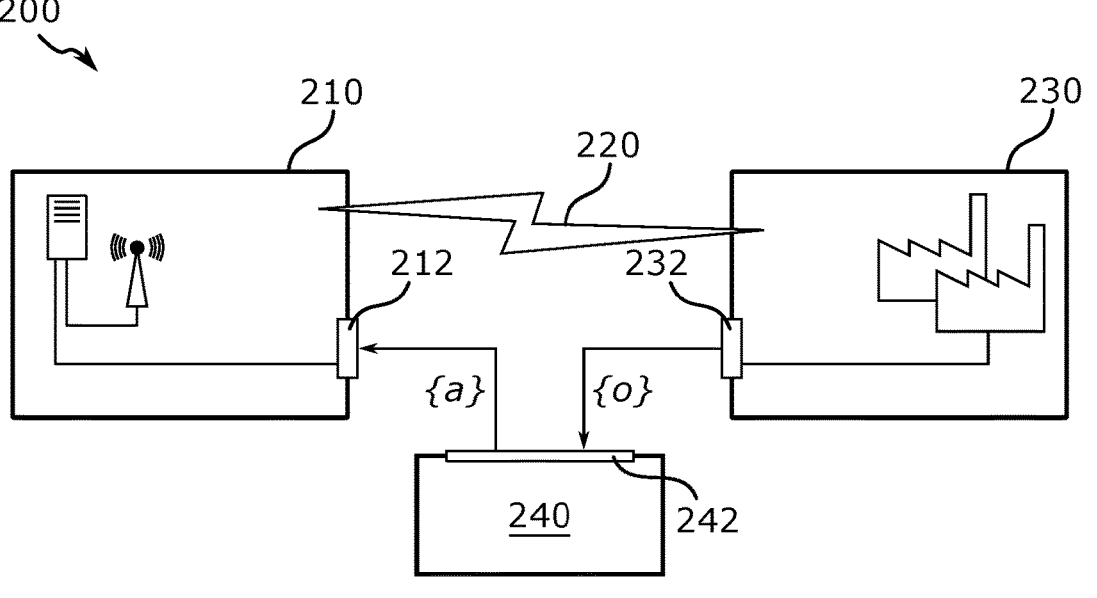
FIG. 2 schematically illustrates an embodiment of a joint system including a computing device in accordance with the present disclosure.

FIG. 2 schematically illustrates a joint system 200 which includes a first system 210 and a second system 230. The first system 210 is envisaged as being a communication service provider, and provides a communication services 220 which is consumed by the second system 230. The second system 230 is e.g. a (smart) factory, a system for autonomous driving, a system for augmented- and/or virtual reality, or similar. For the purpose of illustration, the second system 230 will be assumed to be a (smart) factory which performs one or more manufacturing processes in order to manufacture various items/products/goods. It is further assumed that the second system 230 relies on the communication service 220 for its production, in order to e.g. communicate between the various components and machines used for production as envisaged in e.g. Industry 4.0.

The second system 230 has an interface 232 through which one or more performance indicators of the process(es) performed by the second system 230 may be obtained. Examples of such performance indicators may e.g. be a throughput rate of manufacturing (e.g. how many items that are produced in a specific time period), availability/capacity (of e.g. the various machines used for production), efficiency in terms of energy consumption (e.g. how much energy is consumed in order to produce one item), cycle time (e.g. how much time is passed from start to finish of production of a particular item), downtime (e.g. how much time is spent not producing anything, due to e.g. repairs or other events), and machine production capability (e.g. a maximum amount of items producible given a set amount of resources, such as time, labor, materials, etc.). In some embodiments, the one or more performance indicators may be selected from e.g. those proposed in ISO standard 22400 (relating to manufacturing processes) and/or from those proposed in IEC standard 62264 (also related to manufacturing processes). Other examples are of course also envisaged, as long as at least some knowledge about how successful the process of manufacturing is currently being. The interface 232 may for example be according to the Reference Architecture for Industry 4.0 (RAMI), to collect information technology (IT) and operational technology (OT) data. Other interfaces, such as e.g. I1 may also be used.

The first system 210 includes an interface 212 through which various parameters, such as QoS characteristics, of the first system 110 may be controlled. For example, such QoS characteristics may include packet delay, packet loss, priority, and/or guaranteed/non-guaranteed bit rate. In some embodiments, the QoS characters may be selected from the 5G QoS parameters part of QoS implementation as specified in specification 23.501, and include e.g. 5G QoS Identifier (5GQI), Allocation and Retention Priority (ARP), Reflective QoS Attribute (RQA), Notification Control, Flow Bit Rates, Aggregated Bit Rates; Default Values, and Maximum Packet Loss Rate. By changing the QoS parameters/characteristics, the efficiency of the first system 110 may be controlled.

Further, the proposed joint system 200 includes a computing device 240 configured to perform quality assurance, with the goal of allowing the first system 210 to operate as efficiently as possible while making sure that the SLA with the second system 230 is being met. As will be further described in more detail below, the computing device 210 obtains this goal by being communicatively coupled (via its own interface 242) to (the interfaces 212 and 232 of) both the first system 210 and the second system 230.

In particular, the computing device 240 is configured to receive one or more observations o pertinent to the second system 230 (more specifically, the observations o are observations of the one or more performance indicators (KPIs) described above), and to output one or more control actions a to the first system 210 in order to control the QoS characteristics of the first system 210.

The envisaged operating principle in various embodiments of the computing device 240 will now be described in more detail, in particular with reference also to FIGS. 3 and 4.

The computing device 240 achieves the desired goal by making use of a so-called partially observable Markov decision process (POMDP), which, as the inventors have realized, is particularly suitable for situations including the first and second systems 210 and 230. The general operating principle (and use) of the envisaged POMDP agent 300 (as implemented in the computing device 240) is illustrated schematically in FIG. 3, and is described as follows.

The POMDP is generally defined as a tuple $\langle$ S, A, $\Omega$, T, O, R$\rangle$. Here, S is a finite set of joint states of the joint system 200, A is a finite set of actions, and $\Omega$ is a finite set of observations that can be made of the second system 230. The item T is a transition function defined as $T{:}S{\times}A{\times}S{\rightarrow}[0,1]$, i.e. defining a set of conditional transition probabilities between the various states. The item O is an observation function defined as $O{:}S{\times}A{\times}\Omega{\rightarrow}[0,1]$, i.e. defining a set of conditional observation probabilities. The item R is a reward function defined as $R{:}S{\times}A{\times}S{\rightarrow}\mathbb{R}$ (such that there is e.g. one reward for each start state, action and end state). It can be assumed that there is a total of M possible joint states, a total of N possible actions, and a total of K possible observations (where M, N and K are each integers).

In general, the POMDP builds on the assumption that the true state of the joint system 200 cannot be directly observed by the computing device 240. Instead of such direct observations, a POMDP agent (i.e. as implemented by the computing device 240) has to draw statistical (i.e. uncertain) conclusions about the true state of the joint system 200 by making observations of the second system 230, and in particular by making observations of how such observations change in response to actions taken by the computing device 240 when changing the QoS characteristics of the first system 210. Phrased differently, instead of knowing for sure what state the joint system 200 is currently in, the computing device 240 only has a "belief" about the state of the joint system 200.

Starting e.g. from the right side of FIG. 3, the computing device 240 has a current belief b about the true state of the joint system 200. Based on the policy $\pi$, a policy module 330 decides the appropriate action a for the computing device 240 to take. The computing device 240 changes the one or more QoS characteristics of the first system 210 in accordance with the action $a{=}\pi(b)$ proposed by the policy module 330, and then makes an observation $o{\in}\Omega$ of the joint system 200 to see how the joint system 200 is affected by the action a. Using a state estimation module 310, the computing device 240 then updates (using a belief module 320) its belief about the joint system 200 from the previous belief b to a new belief b', based on the observation o, the performed action a and the previous belief b, and the process repeats itself over again (including a potential update of the policy π).

For example, before taking the action a, the state of the joint system 200 can (even if the state is not directly observable) be assumed to be in some state s∈ S. After taking the action a, the state of the joint system 200 transitions into a new state s', with a conditional probability provided by the transition function T(s'|s,a), i.e. the probability of transitioning to state s' if after being in state s and taking action a. After the state of the joint system 200 has transitioned to s', the computing device 240 makes the observation o with a conditional probability provided by the observation function O(o|s',a), i.e. the probability of making the observation o if being in state s' as a result of taking action a. To update its belief about the joint system 200, the computing device 240 assumes that the behavior of the joint system 200 is Markovian, i.e. that its belief about the new state s' of the joint system 200 only takes into account the previous belief b, the action a taken, and the current observation o, i.e. such that a new belief b' is provided as b'=τ(b,a,o) where τ is some function.

It may be assumed that the belief b is a probability distribution over the state space S, i.e. such that b(s) denotes the probability that the joint system 200 is in the state s. Updating the belief of the computing device 240 then corresponds to updating this probability distribution, such that, after taking the action a and making the observation o, the new probability distribution is $$b'(s') = \eta O(o|s', a) \sum_{s \in S} T(s'|s, a) b(s), \qquad (1)$$

where η is a normalization constant provided by $$\eta = \left( \sum_{s' \in S} O(o|s', a) \sum_{s \in S} T(s'|s, a) b(s) \right)^{-1}. \qquad (2)$$

In each step (i.e. for each time the computing device 240 takes an action a when the joint system 200 is in state s), a reward structure may reward the computing device 240 in accordance with the reward function R(s,a). The goal of the computing device 240 is to maximize the expected total reward by choosing a "correct" sequence of actions a∈ A. For example, the goal of the computing device 240 may be defined as the optimization of the expectation value $$E\left[ \sum_{t=0}^{\infty} \gamma^t R(s_t, a_t) \right],$$

where $R(s_t, a_t)$ is the reward given at time instance t when the state of the joint system 200 is $s_t$ and the action taken is $a_t$, and where γ∈ [0,1] is a discount factor introduced to make the total reward finite as t→∞. Defining the control policy π is thus equal to finding an optimal policy π that maximizes the above expected total reward. As there is uncertainty about the actual state of the joint system 200, such a policy thus maps a belief b to a prescribed action a∈ A.

The above goal may be accomplished by introducing a so-called value function $V_\pi(b)$, which specifies the expected total reward of executing policy π starting from an initial belief $b_0$ (at e.g. time t=0). As known in the art, a value function V* associated with the optimal policy π* can be approximated (arbitrarily closely) by a convex and piece-wise-linear function V(b), at least if the time-horizon for the POMDP is finite. For further details of how to numerically solve POMDP problems as envisaged herein, reference is provided to e.g. H. Kurniawati et al, "SARSOP: Efficient point-based POMDP planning by approximating optimally reachable belief spaces", In Proc. Robotics: Science and Systems, 2008, and the further references provided therein.

The transition function T(s',|s,a) can be written as an array of two-dimensional arrays, i.e.

$$\hat{T} = \left[ T_{s',s,a_1}; T_{s',s,a_2}; \dots ; T_{s',s,a_N} \right], \qquad (3)$$

where $T_{s',s,a_n}$ are matrices of size M×M, defining the probabilities of transitioning from state s to state s' as a result of taking action $a_n$. Phrased differently, an element $T_{m',m,n}$ thus indicates the probability of transitioning from the state s=$s_m$∈ S to the state s'=$s_{m'}$∈ S as a result of taking action $a_n$.

The observation function O(o|s',a) can also be written as an array of two-dimensional arrays, i.e.

$$\hat{O} = \left[ O_{o,s',a_1}; O_{o,s',a_2}; \dots ; O_{o,s',a_n} \right], \qquad (4)$$

where $O_{o,s',a_n}$ are matrices of size K×M, defining the probabilities of making the observation o if being in state s' after having taken action $a_n$. Phrased differently, an element $O_{k,m',n}$ thus indicates the probability of making the observation o=$o_k$∈ Ω if being in state s'=$s_{m'}$∈ S after having taken action $a_n$∈ A.

After having made the observation $o_k$ after taking action $a_n$, the new belief b'(s') (i.e. a probability distribution over the state space S) can be written as an array $$\hat{b}' = [b'_1, b'_2, \dots, b'_M], \qquad (5)$$

where $b_m$', is the probability of being in state s'=$s_{m'}$∈ S.

The reward function R(s,a) can be written as a two-dimensional array (matrix) R̂, where the elements $R_{s,a}$ of R correspond to a rewards (∈ ℝ ) given if transitioning to state b after taking action a. Phrased differently, an element $R_{m,n}$ is the reward given if transitioning to state s=$s_m$∈ S after taking action a=$a_n$∈ A.

Based on the above, equations (1) and (2) can be rewritten as $$b'_{m'} = \eta O_{k,m',n} \sum_{m=1}^{M} T_{m',m,n} b_m, \qquad (6)$$

where $b_m$ are elements of the previous belief array b̂=[$b_1$, $b_2$, . . . , $b_M$], and where the normalization constant η is defined as $$\eta = \left( \sum_{m''=1}^{M} O_{k,m'',n} \sum_{m=1}^{M} T_{m'',m,n} b_m \right)^{-1}. \qquad (7)$$

A flow of an embodiment of the envisaged method of performing control allocation in the computing device 240 will now be described in more detail with reference to FIG. 4.

FIG. 4 schematically illustrates a flow of a method 400. In steps S401 and S402, the method 400 includes to define the (finite) set of (hidden) states S of the joint system 200, and the (finite) set of actions A available to the computing device 240, i.e. the set of possible changes of the one or more QoS characteristics of the communication service provided by the first system 210. In a step S403, the method 400 includes using the POMDP as described herein to define the (optimal) control policy π, which maps beliefs b to actions a such that the computing device 240 may determine which action that is appropriate to take for a certain belief, in order to (eventually) transition the state of the joint system 200 to a state in which the SLA-fulfillment and efficiency of the first system 210 are both improved. This includes, in a step S404, for the computing device 240 to receive observations o indicative of one or more process performance indicators (e.g. one or more KPIs) of the second system 230 and, in a step S405, to update a current belief about the state of the joint system 200 based on the received observations. Finally, in a step S406, the computing device 240 controls the communication service provided by the first system 210 based on the current belief and by performing the action(s) suggested by the control policy π.

An example illustrating the advantages of the envisaged method will now be provided below with reference also to FIG. 5.

In this example, it is assumed that the second system 230 is a manufacturing plant (i.e. a factory), and that there is a total of four different states $s_{1-4}$ (i.e. M=4) in the set of states S, where the first state $s_1$ includes that the SLA is fulfilled and the communication service is efficient (a "valid-efficient" state), the second state $s_2$ includes that the SLA is fulfilled and the communication service is inefficient (a "valid-inefficient" state), the third state $s_3$ includes that the SLA is not fulfilled and the communication service is efficient (an "invalid-efficient" state), and where the fourth state $s_4$ includes that the SLA is not fulfilled and the communication service is inefficient (an "invalid-inefficient" state). It is further assumed that there are eight possible actions $a_{1-8}$ (i.e. N=8) in the set A, where the first action $a_1$ includes to decrease a packet delay of the communication service, where the second action $a_2$ includes to increase the packet delay, where the third action $a_3$ includes to increase a bit rate of the communication service, where the fourth action $a_4$ includes to decrease the bit rate, where the fifth action $a_5$ includes to decrease a packet drop of the communication service, where the sixth action $a_6$ includes to increase the packet drop, where the seventh action $a$, includes to increase a coverage, and where the eight action $a_s$ includes to decrease the coverage.

In this example, information about a performance of the process performed by the manufacturing plant can be obtained by studying three ISO KPIs in particular, namely delay time, downtime, and production efficiency. To simplify the example, it is assumed that (through the interface 232) the computing device 240 can make four different observations $o_{1-4}$ (i.e. K=4). These four observations thus define the set Ω, where the first observation $o_1$ includes no observable change of the KPIs, where the second observation $o_2$ includes an observed delay time decrease, where the third observation $o_3$ includes an observed downtime decrease, and where the fourth observation $o_4$ includes an observed ISO production efficiency decrease.

It should be noted that the current example is only one of many, and that there may of course be e.g. additional states, additional actions, and/or additional observations. For example, the set of observations Ω may be extended to include e.g. observations where the delay time increases, where the downtime increases, and/or where the production efficiency increases, or similar. The various KPIs may of course also be extended to include more KPIs as mentioned herein, or e.g. be reduced to include fewer KPIs, or changed to include other KPIs instead, etc.

In the present example, it is assumed that all the elements $T_{m',m,n}$ are zero, except that $T_{2,2,1}=1.0$, $T_{2,2,1}=1.0$, $T_{1,3,1}=1.0$, $T_{2,4,1}=1.0$; $T_{1,1,2}=0.5$, $T_{3,1,2}=0.5$, $T_{1,1,2}=1.0$, $T_{3,3,2}=1.0$, $T_{3,4,2}=1.0$; $T_{2,1,3}=1.0$, $T_{2,2,3}=1.0$, $T_{1,3,3}=1.0$, $T_{2,4,3}=1.0$; $T_{1,1,4}=0.5$, $T_{3,1,4}=0.5$, $T_{1,1,4}=1.0$, $T_{3,3,4}=1.0$, $T_{3,4,4}=1.0$; $T_{2,1,5}=1.0$, $T_{2,2,5}=1.0$, $T_{1,3,5}=1.0$, $T_{2,4,5}=1.0$; $T_{1,1,6}=0.5$, $T_{3,1,6}=0.5$, $T_{1,1,6}=1.0$, $T_{3,3,6}=1.0$, $T_{3,4,6}=1.0$; $T_{1,1,7}=1.0$, $T_{2,2,7}=1.0$, $T_{1,3,7}=1.0$, $T_{2,4,7}=1.0$; and $T_{3,1,8}=1.0$, $T_{4,2,8}=1.0$, $T_{3,3,8}=1.0$, $T_{4,4,8}=1.0$.

It is further assumed that the observation function does not depend on the state s', i.e. that O(o|s',a)=O(o|a), and that all elements $O_{k,m',n}$ are zero, except that $O_{1,:,1}=0.5$, $O_{4,:,1}=0.5$; $O_{1,:,}=0.2$, $O_{2,:,2}=0.4$, $O_{3,:,2}=0.4$; $O_{1,:,3}=0.5$, $O_{4,:,4}=0.5$; $O_{1,:,4}=0.2$, $O_{2,:,4}=0.4$, $O_{3,:,4}=0.4$; $O_{1,:,5}=0.5$, $O_{4,:,5}=0.5$; $O_{1,:,6}=0.2$, $O_{2,:,6}=0.4$, $O_{3,:,6}=0.4$; $O_{1,:,7}=0.5$, $O_{4,:,7}=0.5$; and $O_{1,:,8}=0.2$, $O_{2,:,8}=0.4$, $O_{3,:,8}=0.4$, where ":" means "any value of index m'" (as the observation function is independent of s'). The transition and observation probabilities may e.g. be estimated/derived based on the findings of R. Kiesela et al, "Quantification of Influence of 5G Technology Implementation on Process Performance in Production", 54th CIRP Conference on Manufacturing Systems, 2021.

Finally, in the current example, the reward function R (s,a) is assumed to be independent of the action a, i.e. such that R(s,a)=R(s), and be such that $R_{1,:}=+30$, $R_{2,:}=+20$, $R_{3,:}=0$ and $R_{4,:}=-10$, wherein ":" means "for any value of index n" (as the reward function is independent of the action a), and where being in the state $s_1$ thus comes with the greatest reward followed by $s_2$, $s_3$ and $s_4$ in that order.

Figures 5, 6A, 6B:
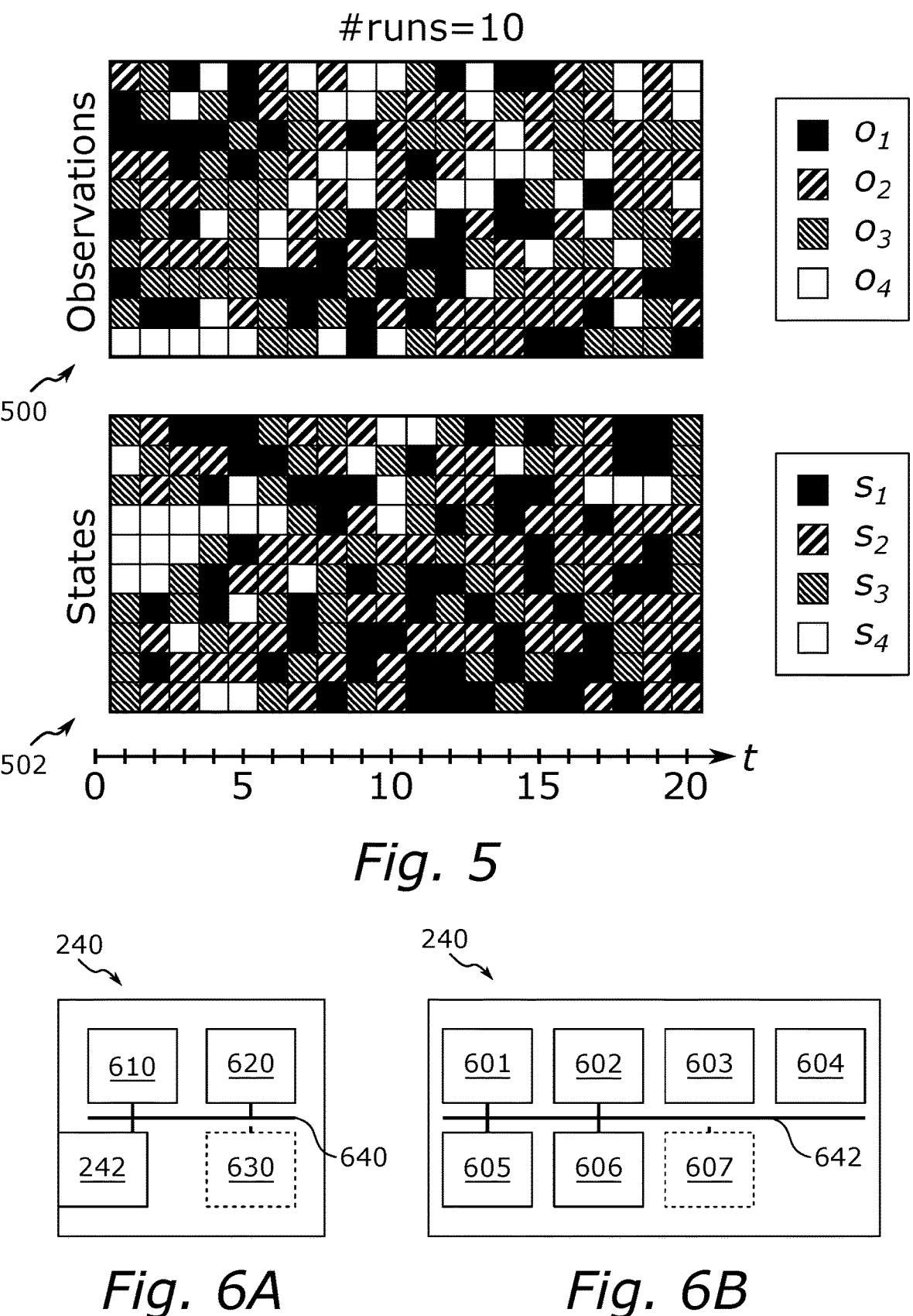
FIG. 5 schematically illustrates results of performing a method according to the present disclosure, and FIGS. 6A and 6B schematically illustrate embodiments of a computing device according to the present disclosure.

FIG. 5 schematically illustrates the progress of ten example runs of the envisaged method in this example. For each run, it is assumed that the initial belief state $b(s_{t=0})$ is a uniform probability distribution, i.e. such that there is a same assumed probability of being in any state of the set S, and that the discount factor is γ=0.9.

In FIG. 5, plots 500 and 502 schematically illustrates the made observations and the evolution of the state of the joint system 200, respectively, both as a function of time t (where, in this example, twenty iterations were made, i.e. such that $t \in [0,20] \in \mathbb{I}$). As can be observed in the plot 500, during the first three iterations t=[1,3], there are multiple instances wherein the joint system 200 is in the worst performing state $s_4$ (i.e. in the "invalid-inefficient" state). As the envisaged method progresses, it learns how to take appropriate actions (based on its policy π) to ensure that the joint system 200 converges to better states. This can be observed in the plot 502 starting at e.g. t=7, after which the number of events at which the joint system 200 is in the worst state $s_4$ severely reduces. Most importantly, as illustrated by the current example, the envisaged method is thus capable of, in only a few time iteration steps, propose optimal actions based on observations of the KPIs of the second system 230, such that observed KPIs improve while simultaneously making sure that the first system 210 (i.e. the communication service) is efficient. This in contrast to expert-driven and/or trial-anderror techniques as conventionally used to tackle a same problem for e.g. 5G industrial network configurations.

A computing device 240 as envisaged herein will now be described in more detail with reference to FIGS. 6A and 6B.

FIG. 6A schematically illustrates, in terms of a number of functional units, the components of an embodiment of a computing device 240 for quality assurance according to the present disclosure. The computing device 240 includes processing circuitry 610. The processing circuitry 610 is provided using any combination of one or more of a suitable central processing unit (CPU), multiprocessor, microcontroller, digital signal processor (DSP), etc., capable of executing software instructions stored in a computer program product (not illustrated herein), e.g. in form of a computer-readable storage medium 620. The processing circuit 610 may further be provided as at least one application specific integrated circuit (ASIC), or field-programmable gate array (FPGA).

Particularly, the processing circuitry 610 is configured to cause the computing device 240 to perform a set of operations, or steps, such as one or more of steps S401-S206 as disclosed above e.g. when describing the method 400 illustrated in FIG. 4. For example, the storage medium 620 may store a set of operations, and the processing circuitry 610 may be configured to retrieve the set of operations from the storage medium 620 to cause the computing device 240 to perform the set of operations. The set of operations may be provided as a set of executable instructions. Thus, the processing circuitry 610 is thereby arranged to execute methods as disclosed herein e.g. with reference to FIGS. 2 through 5.

The storage medium 620 may also include persistent storage, which, for example, can be a memory in form of any single or combination of magnetic memory, optical memory, solid state memory or even remotely mounted memory.

The computing device 240 may further include a communications interface 242 for communications with other entities, functions, nodes, and devices of e.g. the first system 210 and/or the second system 230. For example, the communications interface 242 may allow the computing device 240 to communicate with the second system 230 in order to make observations of the one or more performance indicators of the process(es) performed by the second system 230. As such, the communications interface 242 may include one or more transmitters and receivers, including analogue and/or digital components.

The processing circuitry 610 controls the general operation of the computing device 240 e.g. by sending data and control signals to the communications interface 242 and the storage medium/memory 620, by receiving data and reports from the communications interface 242, and by retrieving data and instructions from the storage medium 620. Other components, as well as their related functionality, of the computing device 240 may of course also be included (as illustrated by the dashed box 630), but any description thereof is omitted in order not to obscure the concepts presented herein. A communication bus 640 is included and configured to allow the various units 610, 620 and 242 (and optionally also 630) to exchange data and information with each other as required.

FIG. 6B schematically illustrates, in terms of a number of functional modules 601-606, the components of a computing device 240 according to one embodiment of the present disclosure. The computing device 240 includes at least a define module 601 configured to perform step S401 of the method 400 described with reference to FIG. 4, a define module 602 configured to perform step S402, a POMDP module 603 configured to perform step S403, an observation module 604 configured to perform step S404, a belief module 605 configured to perform step S405, and a control module 606 configured to perform step S406. The belief module may of course, in some embodiments of the computing device 240, form an integrated part of the POMDP module 603, and the POMDP module 603 (and the POMDP module 603 and the belief module 605) may e.g. correspond to the various modules 310, 320 and 330 shown in FIG. 3.

In general terms, each functional module 601-606 may be implemented in hardware or in software. Preferably, one or more or all functional modules 601-606 may be implemented by the processing circuitry 610, possibly in cooperation with the communications interface 242 and/or the storage medium 620. The processing circuitry 610 may thus be arranged to from the storage medium 620 fetch instructions as provided by a functional modules 601-606, and to execute these instructions and thereby perform any steps of the method 400 performed by the computing device 240 as disclosed herein.

In some embodiments, the computing device 240 may further include additional functional modules (illustrated by the dashed box 607) as required to perform other tasks of the computing device 240, e.g. as defined by the accompanying dependent claims. A communication bus 642 (logical or physical) is provided to allow the various functional modules 601-606 (and optionally 607) to communicate/exchange data and information as required.

The present disclosure also provides a joint system as already discussed with reference to FIG. 2. In some embodiments, the joint system 200 may e.g. form part of an Industry 4.0 solution.

Although not illustrated in any drawings and Figures hereof, the present disclosure also provides a computer program and computer program product as already described herein. The computer program product includes a computer-readable storage medium on which the envisaged computer program is stored. As described already, the computer program includes computer code that, when run on processing circuitry (such as 610) of a computing device (such as 242), the computer code causes the computing device to perform any method disclosed and discussed herein, e.g. by executing the steps S401-S406 of the method 400 described with reference to FIG. 4. Consequently, the computer program and/or computer program product may thus provide the means for performing any steps of e.g. the method 400 and/or to make the envisaged computing device 240 operate as intended.

The computer program product can be provided for example as an optical disc, such as a CD (compact disc) or a DVD (digital versatile disc) or a Blu-Ray disc. The computer program product could also be embodied as a memory, such as a random-access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, the computer program can be stored in any way which is suitable for the computer program product, i.e. on the computer-readable storage medium.

In brief summary of the present disclosure, there has herein been disclosed an improved way quality assurance in a joint system including a communication service provider and a consumer of the communication service, such that both an efficiency of the communication service can be improved while any SLA with the consumer is still met. This by implementing a model-based reinforcement learning technique in the form of a POMDP, to learn how to adjust various QoS/5GI characteristics of the communication service, without having to use conventional expert-driven and/ or trial-and-error-driven processes for finding the right QoS characteristics and their values. The envisaged method (and devices and systems implementing such a method) are able to provide a control policy that captures the inherent uncertainty in e.g. mapping Industry 4.0 KPIs to 5G network metrics, or vice versa. The actions proposed by the policy can capture a tradeoff between e.g. industrial KPI improvement and network optimality. That the envisaged method works has also been demonstrated in a realistic use case example for Industry 4.0, as implanted e.g. in the 5G SMART project of the European Union.

As has also been mentioned herein, the envisaged method of mapping various KPIs and e.g. 5G network metrics is not limited only to industry/manufacturing. To the contrary, the envisaged method may serve as a useful tool to optimize the 5G network metrics also for various KPIs related to other processes, in other areas, such as e.g. for autonomous or semi-autonomous vehicles, VR/AR solutions, or other "smart solutions" wherein one or more processes are performed and requires close collaboration between e.g. robots, machines, and humans to make the processes run effective and smooth. In particular, the envisaged solution of the present disclosure improves the configuration of communication services upon which these processes rely heavily, and where a fulfillment of an SLA with the communication service provider is imperative. Examples envisaged use cases include:

5G-connected robots, including a coordination of robots all connected to a 5G network over wireless links with multiple communication stream requirements for e.g. motion control, video streaming, and data reporting. The envisaged solution of the present disclosure can e.g. satisfy network configuration management, fault management, mobility management and individual network slices to meet these requirements.

Real-time human-robot interaction, including a coordination of multiple robots with a human in the loop. The envisaged solution of the present disclosure allows to fulfill network configuration management, fault management and mobility management requirements, where the communication service is crucial to e.g. monitor various processes and to provide alarms (such as visual and/or haptic alarms).

5G for wireless acoustic workspace monitoring, including a focus on time-critical process optimization where a monitoring system is connected to e.g. an indoor 5G system and receives and processes data from a wireless sensor system, and provides feedback information to e.g. a machine tool. Such a setup would benefit from the solution of the present disclosure, as it requires network configuration management and fault management for efficient operation, and the envisaged mapping framework would address all such requirements.

Cloud-based mobile robotics, wherein reliable connections to a fleet of automated guided vehicles (AGVs) are crucial, but where mobility constraints arise as challenges. The envisaged mapping framework would address usage simplicity, service guarantees and e.g. 24/7 operation support and integration into existing IT infrastructure requirements to ensure e.g. connectivity and network signal strength throughout the task, despite these mobility constraints.

Other use cases are of course also envisaged, but not further described herein.

Although features and elements may be described above in particular combinations, each feature or element may be used alone without the other features and elements or in various combinations with or without other features and elements. Additionally, variations to the disclosed embodiments may be understood and effected by the skilled person in practicing the claimed invention as defined by the appended patent claims, from a study of the drawings, the disclosure, and the appended claims themselves. In the claims, the words "comprising" and "including" does not exclude other elements, and the indefinite article "a" or "an" does not exclude a plurality. The mere fact that certain features are recited in mutually different dependent claims does not indicate that a combination of these features cannot be used to advantage.

The invention claimed is:

1. A method of quality assurance performed in a computing device associated with a communication service provider, the method comprising:

defining a set of states of a joint system comprising a communication service provided by the communication service provider and a process performed by a consumer while consuming the communication service, each state of the set of states being a hidden state of the joint system, and each such hidden state corresponding to a degree of fulfillment of a service level agreement, SLA, with the consumer of the communication service and a degree of efficiency of the communication service;

defining a set of actions, each action of the set of actions corresponding to a changing of one or more Quality of Service, QoS, characteristics of the communication service;

using a partially observable Markov decision process, POMDP, to define a control policy mapping beliefs about the state of the joint system to preferred actions in order to at least eventually move the joint system towards a state corresponding to one or both of a higher degree of SLA-fulfillment and a higher degree of efficiency;

receiving observations indicative of one or more performance indicators for the process performed by the consumer;

based on the received observations, establishing or updating a belief about a current state of the joint system; and based on the belief about the current state of the joint system, controlling the communication service by performing one or more actions of the set of actions as suggested by the control policy.

2. The method according to claim 1, wherein the one or more QoS characteristics are selected from: packet delay, packet loss, priority, and guaranteed/non-guaranteed bit rate.

3. The method according to claim 1, wherein the process performed by the consumer is a manufacturing process, and wherein the one or more performance indicators are selected from: throughput rate, availability/capacity, efficiency, energy consumption, cycle time, downtime, and machine production capability.

4. The method according to claim 1, wherein defining the control policy includes using a point-based POMDP algorithm.

5. The method according to claim 1, wherein the set of states of the joint system includes at least: a first state corresponding to the SLA not being fulfilled and to the communication service not being efficient; a second state corresponding to the SLA being fulfilled and to the communication service not being efficient; a third state corresponding to the SLA not being fulfilled and to the communication service being efficient, and a fourth state corresponding to the SLA being fulfilled and to the communication service being efficient.

6. The method according to claim 1, wherein the communication service is a fifth-generation, 5G, mobile communications service.

7. The method according to claim 6, wherein the method includes one or both of receiving the observations and controlling the communication service using one or more digital twin interfaces.

8. The method according to claim 1, wherein the process performed by the consumer, and the performance indicators for the process, are as defined in any one of ISO 22400, IEC 62264, ISO 22737, and IEEE P2048.

9. The method according to claim 1, wherein the method further includes implementing a reward structure of the POMDP by assigning positive or higher rewards for states having a higher degree of SLA-fulfillment and a higher degree of efficiency, and by assigning negative or lower rewards for states having one or both of a lower degree of SLA-fulfillment and a lower degree of efficiency.

10. A computing device for quality assurance, comprising processing circuitry and a memory storing instructions, the instructions are such that they, when executed by the processing circuitry, cause the computing device to:

define a set of states of a joint system comprising a communication service provided by the communication service provider and a process performed by a consumer while consuming the communication service, each state of the set of states being a hidden state of the joint system, and each such hidden state corresponding to a degree of fulfillment of a service level agreement, SLA, with the consumer of the communication service and a degree of efficiency of the communication service;

define a set of actions, each action of the set of actions corresponding to a changing of one or more Quality of Service, QoS, characteristics of the communication service;

use a partially observable Markov decision process, POMDP, to define a control policy mapping beliefs about the state of the joint system to preferred actions in order to at least eventually move the joint system towards a state corresponding to one or both of a higher degree of SLA-fulfillment and a higher degree of efficiency;

receive observations indicative of one or more performance indicators for the process performed by the consumer;

based on the received observations, establish or update a belief about a current state of the joint system; and based on the belief about the current state of the joint system, control the communication service by performing one or more actions of the set of actions as suggested by the control policy.

11. The computing device according to claim 10, wherein the one or more QoS characteristics are selected from: packet delay, packet loss, priority, and guaranteed/non-guaranteed bit rate.

12. The computing device according to claim 10, wherein the process performed by the consumer is a manufacturing process, and wherein the one or more performance indicators are selected from: throughput rate, availability/capacity, efficiency, energy consumption, cycle time, downtime, and machine production capability.

13. The computing device according to claim 10, wherein defining the control policy includes using a point-based POMDP algorithm.

14. The computing device according to claim 10, wherein the set of states of the joint system includes at least: a first state corresponding to the SLA not being fulfilled and to the communication service not being efficient; a second state corresponding to the SLA being fulfilled and to the communication service not being efficient; a third state corresponding to the SLA not being fulfilled and to the communication service being efficient, and a fourth state corresponding to the SLA being fulfilled and to the communication service being efficient.

15. The computing device according to claim 10, wherein the communication service is a fifth-generation, 5G, mobile communications service.

16. The computing device according to claim 15, wherein the instructions are further such that they, when executed by the processing circuitry, cause the computing device to perform one or both of receiving the observations and controlling the communication service using one or more digital twin interfaces.

17. A joint system comprising a first system configured to provide a communication service and a second system configured to consume the communication service, and further comprising at least one computing device, the computing device being communicatively coupled to both the first system and the second system, and configured to receive the one or more performance indicators from the second system to control the communication service provided by the first system, the at least one computing device comprising:

processing circuitry and a memory storing instructions, the instructions are such that they, when executed by the processing circuitry, cause the computing device to:

define a set of states of a joint system comprising a communication service provided by the communication service provider and a process performed by a consumer while consuming the communication service, each state of the set of states being a hidden state of the joint system, and each such hidden state corresponding to a degree of fulfillment of a service level agreement, SLA, with the consumer of the communication service and a degree of efficiency of the communication service;

define a set of actions, each action of the set of actions corresponding to a changing of one or more Quality of Service, QoS, characteristics of the communication service;

use a partially observable Markov decision process, POMDP, to define a control policy mapping beliefs about the state of the joint system to preferred actions in order to at least eventually move the joint system towards a state corresponding to one or both of a higher degree of SLA-fulfillment and a higher degree of efficiency;

receive observations indicative of one or more performance indicators for the process performed by the consumer;

based on the received observations, establish or update a belief about a current state of the joint system; and based on the belief about the current state of the joint system, control the communication service by performing one or more actions of the set of actions as suggested by the control policy.

18. The joint system according to claim 17, wherein the second system forms part of a Fourth-industrial revolution, Industry 4.0, solution.

19. A non-transitory computer storage medium storing a computer program for quality assurance, the computer program comprising computer code which, when run on a processing circuitry of a computing device, causes the computing device to:

define a set of states of a joint system comprising a communication service provided by the communication service provider and a process performed by a consumer while consuming the communication service, each state of the set of states being a hidden state of the joint system, and each such hidden state corresponding to a degree of fulfillment of a service level agreement, SLA, with the consumer of the communication service and a degree of efficiency of the communication service;

define a set of actions, each action of the set of actions corresponding to a changing of one or more Quality of Service, QoS, characteristics of the communication service;

use a partially observable Markov decision process, POMDP, to define a control policy mapping beliefs about the state of the joint system to preferred actions in order to at least eventually move the joint system towards a state corresponding to one or both of a higher degree of SLA-fulfillment and a higher degree of efficiency;

receive observations indicative of one or more performance indicators for the process performed by the consumer;

based on the received observations, establish or update a belief about a current state of the joint system; and based on the belief about the current state of the joint system, control the communication service by performing one or more actions of the set of actions as suggested by the control policy.

20. The non-transitory computer program storage medium according to claim 19, wherein the one or more QoS characteristics are selected from: packet delay, packet loss, priority, and guaranteed/non-guaranteed bit rate.

* * * * *